L. F. ADT.
SPECTACLES.
APPLICATION FILED MAY 13, 1910.
1,145,454.
Patented July 6, 1915.
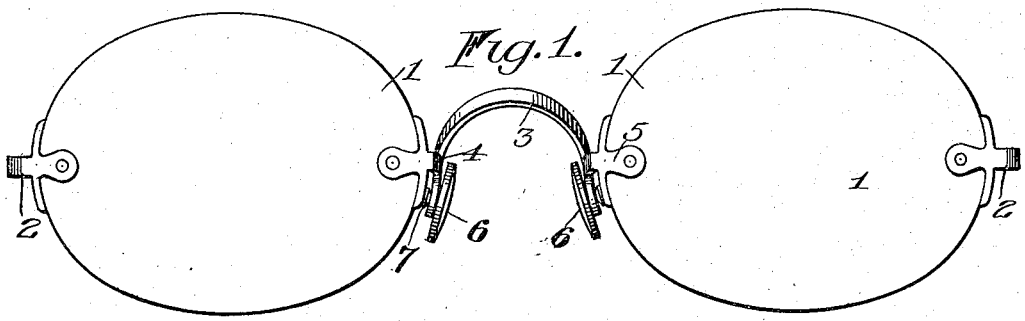
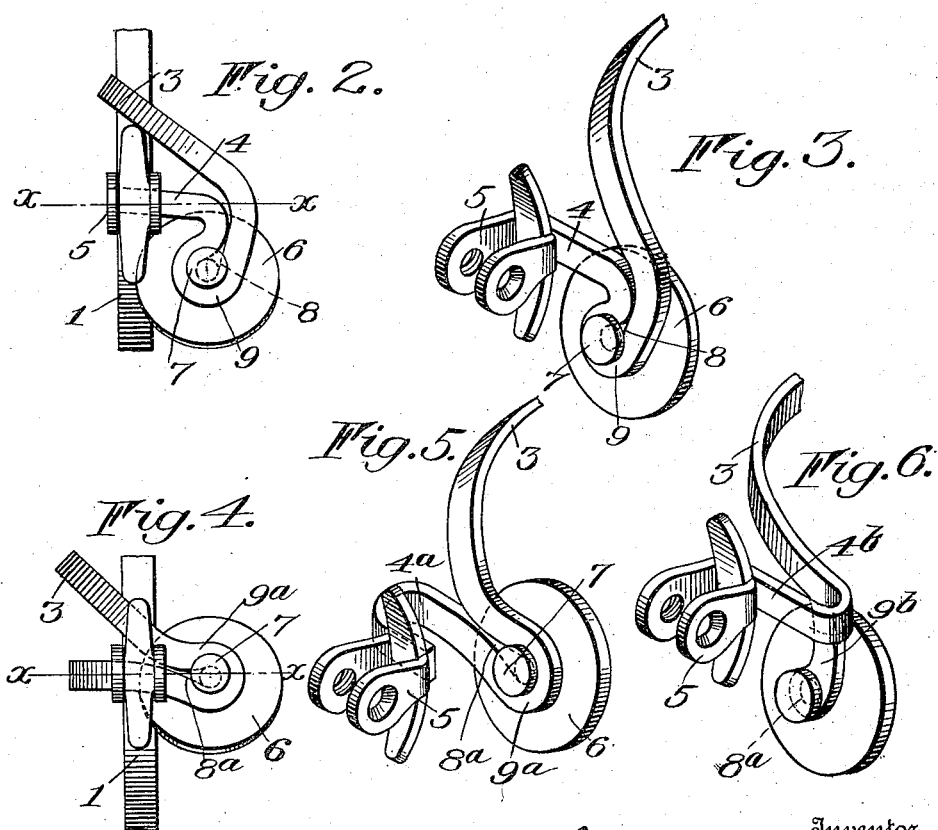

UNITED STATES PATENT OFFICE.

LEO F. ADT, OF ALBANY, NEW YORK.

SPECTACLES.

1,145,454.  Specification of Letters Patent.  Patented July 6, 1915.

Application filed May 13, 1910. Serial No. 561,169.

*To all whom it may concern:*

Be it known that I, LEO F. ADT, of Albany, in the county of Albany and State of New York, have invented certain new and useful Improvements in Spectacles; and I do hereby declare the following to be a full, clear, and exact description of the same, reference being had to the accompanying drawings, forming a part of this specification, and to the reference-numerals marked thereon.

The present invention relates to spectacles and it has for an object to provide a construction having universal rocking pads so located as to bear upon the bony portion of the nose immediately below the fleshy portion between the eyes of a wearer, thus removing the weight of the spectacles from the fleshy portion.

To these and other ends the invention consists in certain improvements and combinations of parts all as will be hereinafter more fully described, the novel features being pointed out in the claims at the end of the specification.

In the drawings: Figure 1 is a front view of a mounting constructed in accordance with the present invention; Fig. 2 is a side view of the mounting with one of the lenses removed; Fig. 3 is a perspective view of part of the mounting near one end; Fig. 4 is a view similar to Fig. 2 of another embodiment of the invention; Fig. 5 is a view similar to Fig. 3 illustrating the embodiment shown in Fig. 4, and Fig. 6 is a view similar to Figs. 3 and 5 illustrating still another embodiment of the invention.

Referring more particularly to the drawings 1 indicates the lenses having temples 2 attached at their outer edges and connected at their inner edges by a mounting which in this instance embodies a bridging portion 3 inclined to the plane of the lenses to conform to the nose of a wearer and pliable portions 4 connecting the bridging portion to the lens attaching device 5 said pliable portions being in this instance in the form of forwardly extending arms arranged in vertical planes with the extremities of the bridging portion transverse to the plane of the lenses.

Supported on the mounting between the pliable portions 4 are nose rests or pads 6. These pads are preferably so located that at least one-half of their nose engaging surfaces lie below the plane of the optical axes of the lenses, while portions of their nose engaging surfaces project into the plane of the lenses. It will thus be seen that the nose engaging surfaces are thrown to positions where they bear directly upon the bony surface of the nose and not on the fleshy portion between the eyes, while permitting the lenses to be adjusted relatively to each other without disturbing the relative positions of the nose rests. Preferably the nose rests have headed pins or studs 7 projecting from the rear faces and loosely engaging within eyes 8 formed on the mounting. In this instance the eyes are formed on portions arranged at the junction of the bridging portion 3 and the pliable portions 4, said portions 3 and 4 being made from a single strip of stock which is looped at 9 between the bridging portion and the pliable portions 4 to provide the eyes 8. In the embodiment shown in Figs. 1 to 3 the loops provide downward extensions on the mounting and throw the point about which the nose rests rock quite a distance below the extremities of the bridging portions 3, and the horizontal plane $x$, $x$ of the axes of the lenses. The downward extensions may be bent in order to permit the nose rests to conform more closely to the nose.

In the embodiment of the invention shown in Figs. 4 and 5 the loops $9^a$, forming the eyes $8^a$ in which the headed pins or projections 7 of the nose rests 6 loosely engage, extend rearwardly from the extremities of the bridging portion so that substantially one-half of the nose engaging surface of the rest lies below the plane $x$, $x$ of the axes of the lenses. The pliable portions $4^a$ embody arms extending forwardly from the loops $9^a$ thence outwardly and thence rearwardly and connected to the lens attaching devices 5, forming horizontal and rearwardly opening loops which permit the forward and rearward adjustment of the lenses in addition to the outward and inward adjustment as provided in the embodiment shown in Figs. 1 to 3.

Instead of providing the eyes by looping a strip of material, an eye $8^a$ may be formed in a portion of the mounting, as for instance in a pliable arm $9^b$ extended downwardly from the mounting between the bridging portion 3 and the pliable portion $4^b$. This arrangement permits the pliable portions $4^b$ to be formed by forwardly extending arms providing forwardly opening and horizontally arranged loops with the extremities of the bridging portion 3, the lens attaching devices 5 being connected to the forward ends of the arms.

In all the embodiments of the invention the bridging portion 3 is inclined to the plane of the lenses so as to conform to the nose of the wearer between the eyes and is connected to the lens attaching device by pliable portions each of which has an arm extending forwardly from the extremity of the bridging portion permitting the lenses to be adjusted inwardly and outwardly to obtain different pupillary distances. The nose rests are so located that they bear upon the bony portion of the nose immediately below the eyes, thus removing the weight of the spectacles from the fleshy portion of the nose. The relative positions of the rests are not disturbed by the adjustment of the lenses and the connection of the rests with the mounting is inconspicuous while at the same time permitting the universal rocking of the rests to conform to the upward and the forward taper of the nose.

I claim as my invention:

1. In a spectacle, the combination with lenses and temples connected thereto, a non-resilient bridging portion having rearwardly disposed ends and lens attaching devices, of downwardly extending adjustable portions connected to the ends of the bridging portion and having fixed spaced relation, non-resilient nose rests separate from and connected to the downwardly extending portions at points removed from the edges of the rests, and forwardly extending arms connecting the ends of the bridging portion with the lens attaching portions, and disposed above the points at which the nose rests are connected to the downwardly extending portions.

2. In a spectacle, the combination with lenses and temples connected thereto, a non-resilient bridging portion, lens attaching devices, and pliable portions connecting the lens attaching devices with the bridging portion, of portions having fixed spaced relation depending from the mounting between the pliable portions and connected to the bridging portion at points in advance of the latter's points of connection with the pliable portions and provided with eyes, said depending portions being adjustable relatively to both the bridge portion and the pliable portions, and nose rests having portions loosely engaging in the eyes.

3. In a spectacle, the combination with lenses and temples connected thereto a non-resilient bridging portion inclined to the plane of the lenses and conforming to the nose, lens attaching devices, and pliable portions connecting the latter with the bridging portion and embodying arms extending forwardly in vertical planes with the extremities of the bridging portions transverse to the plane of the lenses, of portions at the junctions of the arms and the extremities of the bridging portion having fixed spaced relation and provided with eyes, and nose rests having portions loosely engaging in said eyes.

4. In a spectacle, the combination with lenses and temples connected thereto the following parts formed from a single piece of stock; a bridging portion inclined to the plane of the lenses, pliable arms extending forwardly with relation to the bridging portion, and loops forming eyes having fixed spaced relation connecting the bridging portion with the pliable forwardly extending arms; of nose rests having portions loosely engaging in the eyes.

5. In a spectacle, the combination with lenses and temples connected thereto, a non-resilient bridging portion inclined to the plane of the lenses to conform to the nose of the wearer, lens attaching devices, and pliable portions connecting the lens attaching devices to the bridging portion, of loops forming eyes having fixed spaced relation arranged between the pliable portions and the bridging portion, and nose rests carrying portions loosely engaging in said eyes.

6. In a spectacle, the combination with lenses, temples connected thereto, and lens attaching portions, of a non-resilient bridging portion, connecting portions joining the latter to the lens attaching portions and formed from a continuous strip of material therewith, eyes having fixed spaced relation formed by loops in said strip of material and nose rests having portions secured in said eyes.

7. In a spectacle, the combination with lenses, temples connected thereto and lens attaching portions, of a non-resilient bridging portion having rearwardly disposed ends formed of a continuous strip of material proceeding from the said ends forwardly to form horizontal connecting portions joining the bridge to the lens attaching portions, pliable independently adjustable arms depending from the ends of the bridging portion adjacent to the points of juncture with the connecting arms and lying in the planes of the bridge ends in fixed spaced relationship to each other and nose rests carried at the free ends of said arms.

LEO F. ADT.

Witnesses:
L. B. CLEXTON,
ISABEL KELLEY.

Copies of this patent may be obtained for five cents each, by addressing the "Commissioner of Patents, Washington, D. C."